US010510203B2

(12) United States Patent
Masuda et al.

(10) Patent No.: US 10,510,203 B2
(45) Date of Patent: Dec. 17, 2019

(54) IDENTIFICATION DEVICE, IDENTIFICATION METHOD, IDENTIFICATION PROGRAM AND COMPUTER READABLE MEDIUM INCLUDING THE IDENTIFICATIOIN PROGRAM

(71) Applicant: TOPPAN PRINTING CO., LTD., Taito-ku (JP)

(72) Inventors: Tomohito Masuda, Taito-ku (JP); Takashi Okada, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 153 days.

(21) Appl. No.: 15/656,141

(22) Filed: Jul. 21, 2017

(65) Prior Publication Data

US 2017/0323507 A1 Nov. 9, 2017

Related U.S. Application Data

(63) Continuation of application No. PCT/JP2015/083090, filed on Nov. 25, 2015.

(30) Foreign Application Priority Data

Jan. 26, 2015 (JP) ................................ 2015-012333

(51) Int. Cl.
*G07D 7/20* (2016.01)
*B42D 25/328* (2014.01)
(Continued)

(52) U.S. Cl.
CPC ............... *G07D 7/20* (2013.01); *B42D 25/29* (2014.10); *B42D 25/328* (2014.10); *B42D 25/378* (2014.10); *G07D 7/12* (2013.01)

(58) Field of Classification Search
CPC . G07D 7/20; G07D 7/12; B42D 25/29; B42D 25/328; B42D 25/378
(Continued)

(56) References Cited

U.S. PATENT DOCUMENTS 6,848,561 B2 2/2005 Bao
10,019,627 B2 * 7/2018 Kutter ................. G06K 7/1417
(Continued)

FOREIGN PATENT DOCUMENTS

JP 2002-268524 A 9/2002
JP 3865763 B 1/2007
(Continued)

OTHER PUBLICATIONS

Extended Search Report dated Sep. 14, 2018 in European Patent Application No. 15880102.7, citing documents AA and AO therein, 7 pages.
(Continued)

*Primary Examiner* — Jonathan S Lee
(74) *Attorney, Agent, or Firm* — Oblon, McClelland, Maier & Neustadt, L.L.P.

(57) ABSTRACT

A device for determining authenticity including processing circuitry which generates a reference image data of a counterfeit prevention medium at an observation angle for comparison with captured image data obtained based on a pattern of light observed from the counterfeit prevention medium at the observation angle between an imaging direction of the captured image data and a reference line of a surface of the counterfeit prevention medium, calculates similarity between the captured image data and the reference image data, and determines authenticity of the counterfeit prevention medium based on whether the similarity exceeds a threshold.

15 Claims, 10 Drawing Sheets

(51) Int. Cl.
*G07D 7/12* (2016.01)
*B42D 25/29* (2014.01)
*B42D 25/378* (2014.01)

(58) Field of Classification Search
USPC .......................................................... 382/135
See application file for complete search history.

(56) References Cited

U.S. PATENT DOCUMENTS

2003/0021437 A1* 1/2003 Hersch ..................... B41M 3/14
382/100
2003/0178282 A1 9/2003 Bao
2005/0052705 A1* 3/2005 Hersch ..................... B41M 3/14
358/3.28
2016/0307035 A1* 10/2016 Schilling ................ G07D 7/128
2017/0355214 A1* 12/2017 Okada ...................... G07D 7/12
2018/0215188 A1* 8/2018 Wang ..................... B42D 25/30
2018/0264868 A1* 9/2018 Okada .................. B42D 25/369
2018/0276523 A1* 9/2018 Okada .................. G06K 7/1443
2019/0034773 A1* 1/2019 Vosoogh-Grayli ...........................
G06K 7/10722

FOREIGN PATENT DOCUMENTS

JP 2010-262394 A 11/2010
JP 2014-166695 A 9/2014

OTHER PUBLICATIONS

Office Action dated Nov. 22, 2016 in Japanese Application No. 2016-512148, filed Mar. 7, 2016 (with English translation).
International Search Report dated Jan. 12, 2016 in PCT/JP2015/083090 filed Nov. 25, 2015.

* cited by examiner

| CAPTURED IMAGE DATA IDENTIFICATION INFORMATION | OBSERVATION ANGLE | OBSERVATION POSITION | CAPTURED IMAGE DATA ADDRESS |
|---|---|---|---|
| ***** | ***** | ***** | ***** |
| ***** | ***** | ***** | ***** |
| ***** | ***** | ***** | ***** |
| ⋮ | ⋮ | ⋮ | ⋮ |

| DETERMINATED IMAGE DATA IDENTIFICATION INFORMATION | CAPTURED IMAGE DATA IDENTIFICATION INFORMATION | REFERENCE IMAGE DATA ADDRESS | SIMILARITY |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

IDENTIFICATION DEVICE, IDENTIFICATION METHOD, IDENTIFICATION PROGRAM AND COMPUTER READABLE MEDIUM INCLUDING THE IDENTIFICATIOIN PROGRAM

CROSS-REFERENCE TO RELATED APPLICATIONS

The present application is a continuation of International Application No. PCT/JP2015/083090, filed Nov. 25, 2015, which is based upon and claims the benefits of priority to Japanese Application No. 2015-012333, filed Jan. 26, 2015. The entire contents of these applications are incorporated herein by reference.

BACKGROUND OF THE INVENTION

Field of the Invention

The present invention relates to identification devices, identification methods, identification programs and computer readable medium, which are applicable to an authenticity determination for counterfeits of valuable securities such as of gift vouchers or the like, credit cards, branded goods, and equipment components.

Discussion of the Background

Conventionally, counterfeit prevention media have been used to prevent unauthorized use, due to counterfeiting or copying, of valuable securities such as banknotes, share certificates, gift vouchers and credit cards, and products such as pharmaceutical products, food products and high-class brand products. Such a counterfeit prevention medium is directly printed or transferred onto valuable securities. Also, products are provided with sealing stickers or tags to which a counterfeit prevention medium is applied.

However, in recent years, these counterfeit prevention media have also been counterfeited or copied to produce unauthorized valuable securities or products. Hence, it is difficult to distinguish fraudulent (counterfeited or copied) products or non-fraudulent products only relying on the presence of the counterfeit prevention medium.

Examples of the above-described counterfeit prevention medium include a diffraction grating or a hologram in which the color or the patterns vary depending on the observation angle. Moreover, as another example of such a counterfeit prevention medium, OVD (optically variable device) ink or pearl pigment or the like can be used, in which the color or the brightness varies.

Specifically, a counterfeit prevention medium may be compared with the genuine counterfeit prevention medium, thereby readily determining whether the counterfeit prevention medium is genuine. Also, an expert can perform a visual inspection thereby readily determining whether the counterfeit prevention medium is genuine. However, it is difficult for an ordinary user to visually determine at once whether a counterfeit prevention medium is genuine or not.

In the case where difficult to determine by a visual inspection whether the counterfeit prevention medium is genuine, a dedicated authenticity determination device (e.g., refer to JP 3865763 B) is utilized in which an observation angle of an imaging device to the counterfeit prevention medium can be precisely controlled.

However, since specialized knowledge or dedicated equipment is required to handle the above authenticity determination device, an ordinary user cannot determine whether the counterfeit prevention medium is genuine by using such equipment.

When determining authenticity of a counterfeit prevention medium in which an optical change occurs in the pattern when observed at predetermined observation angles, the optical change in the pattern varies depending on the observation angle. Hence, the observation angle has to be estimated to determine an imaging direction of the imaging device that observes the counterfeit prevention medium. When estimating the observation angle, conventionally, a gyro sensor included in the imaging device is used.

Moreover, a method using an identification program can be used to determine authenticity of a counterfeit prevention medium. The identification program processes an observation angle estimated by using the gyro sensor and captured image information about the counterfeit prevention medium for which authenticity is determined.

However, the gyro sensor estimates an inclination of the imaging device with respect to the local horizontal plane on the earth. Hence, since the gyro sensor is included in the imaging device, unless the counterfeit prevention medium is placed horizontally with respect to the local horizontal plane on the earth, the imaging device cannot estimate the observation angle accurately.

SUMMARY OF THE INVENTION

According to an aspect of the present invention, a device for determining authenticity includes processing circuitry configured to generate a reference image data of a counterfeit prevention medium at an observation angle for comparison with captured image data obtained based on a pattern of light observed from the counterfeit prevention medium at the observation angle between an imaging direction of the captured image data and a reference line of a surface of the counterfeit prevention medium, calculate similarity between the captured image data and the reference image data, and determine authenticity of the counterfeit prevention medium based on whether the similarity exceeds a threshold.

According to another aspect of the present invention, a non-transitory computer-readable medium including computer executable instructions, wherein the instructions, when executed by a computer, cause the computer to perform a method of determining authenticity, includes generating a reference image data of a counterfeit prevention medium at an observation angle for comparison with a captured image data obtained based on a pattern of light observed from the counterfeit prevention medium at the observation angle between an imaging direction of the captured image data and a reference line of a surface of the counterfeit prevention medium, calculating similarity between the captured image data and the reference image data, and determining authenticity of the counterfeit prevention medium based on whether the similarity exceeds a threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
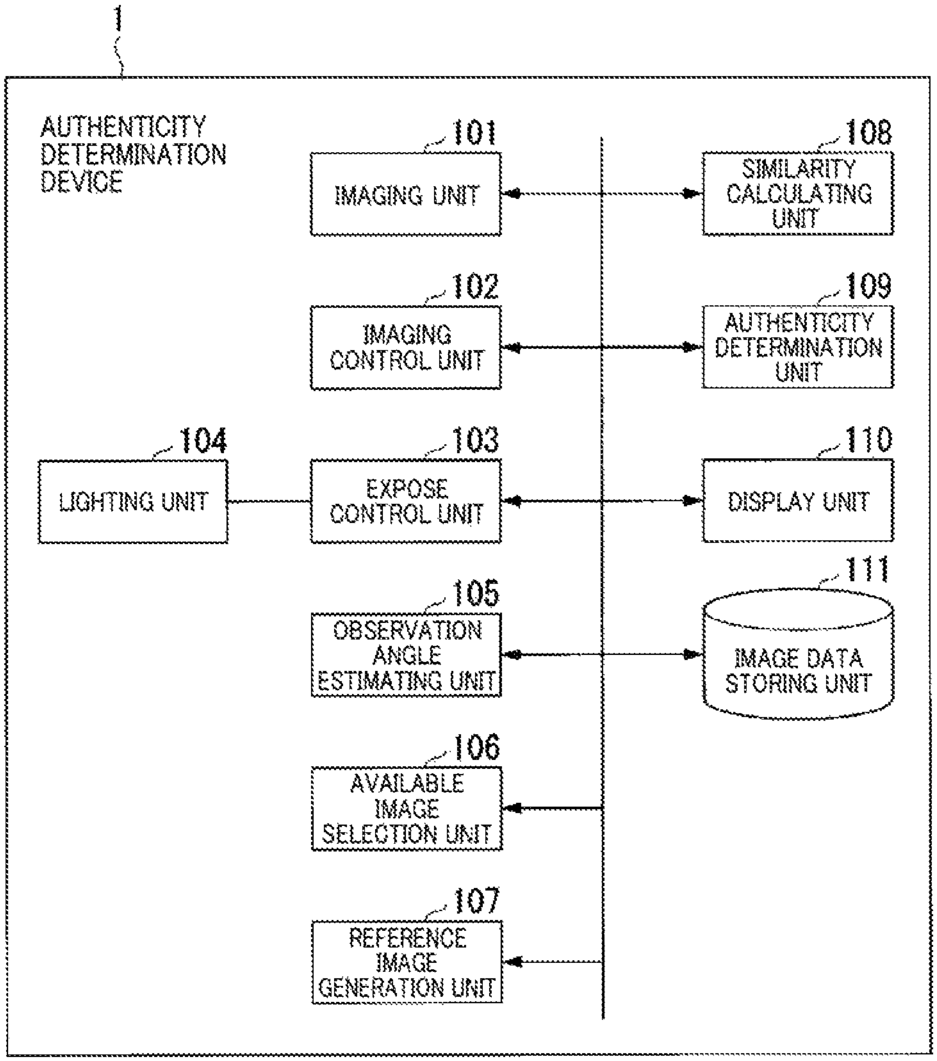
FIG. 1 is a block diagram showing a configuration example of an identification system according to the first embodiment.

The embodiments will now be described with reference to the accompanying drawings, wherein like reference numerals designate corresponding or identical elements throughout the various drawings.

First Embodiment

Hereinafter, with reference to the drawings, a first embodiment of the present invention will be described.

FIG. 1 is a block diagram showing a configuration example of an identification system (authenticity determination device or identification device) according to a first embodiment. In FIG. 1, the authenticity determination device 1 is provided with an imaging device 101, an imaging control unit 102, an exposure control unit 103, a lighting unit 104, an observation angle estimating unit 105, an available image selection unit 106, a reference image generation unit 107, a similarity calculating unit 108, an authenticity determination unit 109, a display unit 110 and an image data storing unit 111. In the identification system according to the first embodiment, the imaging unit 101 and the lighting unit 104 are integrated. The identification system according to the first embodiment has a configuration that performs authenticity determination processing of a counterfeit prevention medium retroreflectively reflecting light.

The imaging unit 101 is configured as a camera using an image sensor such as a CCD (charge coupled device) or CMOS (complementary metal oxide semiconductor), which writes and stores an image including a captured object into the image data storing unit 111 as a captured image data.

The image control unit 102 controls imaging conditions of the imaging unit 101, including a depth of focus, and a sensitivity of the imaging device (ISO (international organization for standardization) sensitivity), when the imaging unit 101 captures an image of light pattern (color of light (i.e., wavelength) or an image of characters or pictures) emitted from the counterfeit prevention medium, corresponding to the incident light.

The exposure control unit 103 controls the imaging conditions of the imaging unit 101 as exposure conditions of imaging, including shutter speed, a diaphragm value, whether illumination light is required or not, and intensity of illumination light. The exposure control unit 103 senses the brightness surrounding the counterfeit prevention medium to be captured by the authenticity determination device 1, and outputs an emission command to the lighting unit 104, enabling the lighting unit 104 to emit imaging light (illumination light) as needed during the imaging operation.

The lighting unit 104 may be configured not only as an ordinary light emission device that emits continuous illumination light to an imaging object, but also as a light emission device, a so called flash or strobe light unit, that emits light in a short period of time to an imaging object. The lighting unit 104 emits light having a predetermined intensity to the object to be captured, in response to the emission command from the exposure control unit 103. The image control unit 102 transmits a control signal indicating a capturing timing to the exposure control unit 103. Thus, in response to the signal indicating a capturing timing transmitted from the image control unit 102, the exposure control unit 103 outputs, as described above, an emission command to the lighting unit 104, enabling the lighting unit 104 to emit illumination light to the counterfeit prevention medium.

The observation angle estimating unit 105 calculates, based on a coordinate conversion equation (described later), observation positions (coordinate values) corresponding to respective captured images of the counterfeit prevention medium in the three-dimensional space, and image directions of the imaging unit 101. In other words, the observation angle estimating unit 105 calculates an observation angle of the counterfeit prevention medium in the respective captured images based on the calculated observation positions and the imaging directions.

The observation angle estimating unit 105 writes/stores, into the captured image data table of the image data storing unit 111, captured image information including the calculated observation positions and the observation angles, together with captured image identification information imparted to the captured images, to identify each of the captured images. The pattern of light emitted from the counterfeit prevention medium in relation to the incident light differs depending on the observation angle.

The imaging unit 101 captures one or more image data of the counterfeit prevention medium at a predetermined focal length. When a plurality of image data is captured, the observation angles corresponding to the respective image data have to be different from each other. The observation angle estimating unit 105 estimates, from the one or more captured image data, the observation angles corresponding to the respective captured image data of the counterfeit prevention medium in the three-dimensional space, by using a predetermined coordinate conversion equation as described above.

The coordinate conversion equation used in the embodiment is generated when pixel positions of a plurality of captured image data in a two-dimensional coordinate are correlated to coordinate positions in a three-dimensional space. The three-dimensional space is reproduced in advance from a plurality of captured image data (image data that includes an image of a calibration board which will be described later), as a preprocess (preparation for authenticity determination) preceding an authenticity determination for a counterfeit prevention medium provided in an object to be determined. The coordinate conversion equation generated in advance is written/stored into the image data storing unit 111 for an object to be determined or every object to be determined.

Figures 2, 3:
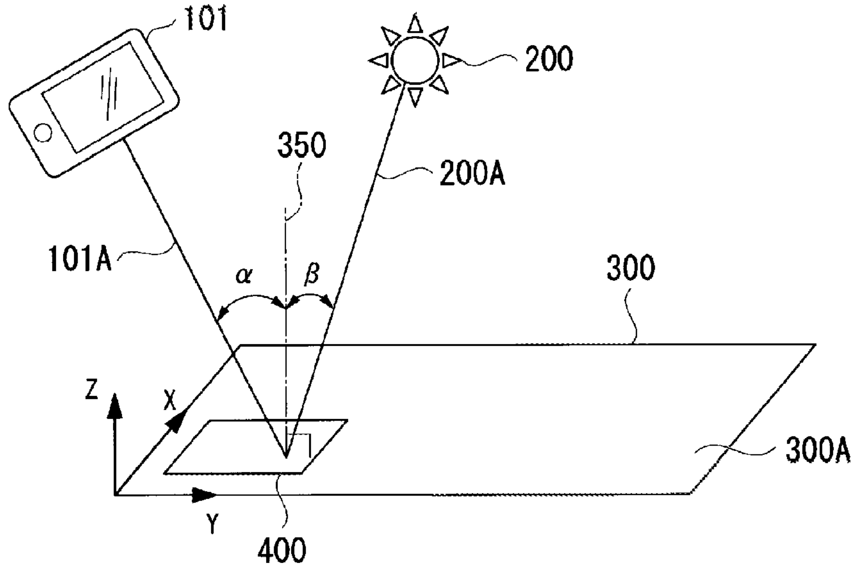
FIG. 2 is a diagram showing a configuration example of a captured image data table in an image data storing unit 111.
FIG. 3 is a diagram showing an observation angle of the imaging unit 101 for a counterfeit prevention medium.

FIG. 2 is a diagram showing a configuration example of a captured image data table in the image data storing unit 11. In the image data table shown in FIG. 2, pieces of captured image data identification information, observation angles corresponding to the pieces of captured image data identification information, observation positions and captured image data addresses are written and stored. The captured image data identification information identifies each of the captured image data.

The above-described observation angle is defined as, for example, an angle of the imaging direction of the imaging unit 101 when capturing the image data with respect to the line normal to the surface of the counterfeit prevention medium, where an object to be determined authenticity is placed as an origin in a coordinate of the three-dimensional space (hereinafter referred to as three-dimensional coordinate), the origin being defined as any one of apexes or coordinate points of the object to be determined. The observation point indicates a coordinate at which the imaging unit 101 captures an image of the object to be determined in the three-dimensional space. The captured image data address indicates an address pointing a region including each captured image data stored in the image data storing unit 111 and serves as an index of the captured image data when read.

FIG. 3 is a diagram showing an observation angle of the imaging unit 101 for a counterfeit prevention medium. In FIG. 3, a counterfeit prevention medium 400 is used to prevent counterfeiting and copying of notes such as banknotes, share certificates, gift vouchers, or valuable securities such as credit cards, products such as pharmaceutical products, food products and high-class brand products. The counterfeit prevention medium 400 is directly printed or transferred onto the notes or the valuable securities, or printed or transferred onto sealing stickers or tags attached to products (or packaging of products).

In FIG. 3, the counterfeit prevention medium 400 is provided on the surface of a credit card 300. Examples of the counterfeit prevention medium 400 according to the present embodiment include a diffraction grating or a hologram in which the color or the patterns vary depending on the observation angle. Also, OVD (optically variable device) ink or a pearl pigment can be used in which the color or the brightness varies depending on the observation angle (will be described in more detail later). A light source (also referred to as illumination) 200 emits light for capturing an image to the counterfeit prevention medium 400 at an irradiation angle $\beta$ formed between the irradiation direction of light 200A and a normal line 350. With the entry of the light for capturing an image, the counterfeit prevention medium 400 emits light having a predetermined pattern. The light pattern emitted in response to the irradiation light from the counterfeit prevention medium depends on the observation angle $\alpha$ and the irradiation angle $\beta$.

The counterfeit prevention medium 400 will be described in more detail.

The counterfeit prevention medium 400 may be like a hologram that emits various types of diffracted light due to diffracted structure. In this case, various types of holograms can be used including reflection type, transmission type, phase type and volume type.

Hereinafter, an example of relief type structure having uneven structure will mainly be described.

Figure 4:
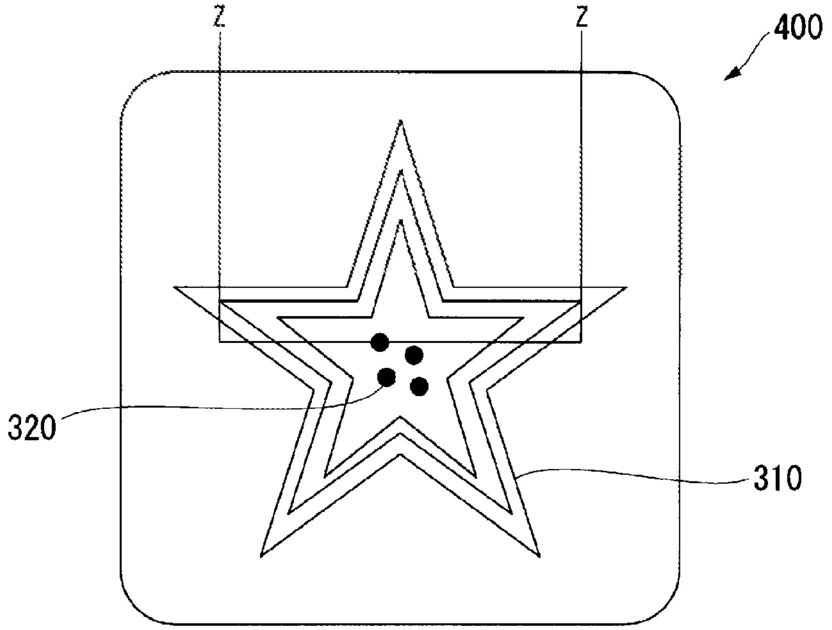
FIG. 4 is a plan view roughly showing a counterfeit prevention medium according to the first embodiment.
Figure 5:
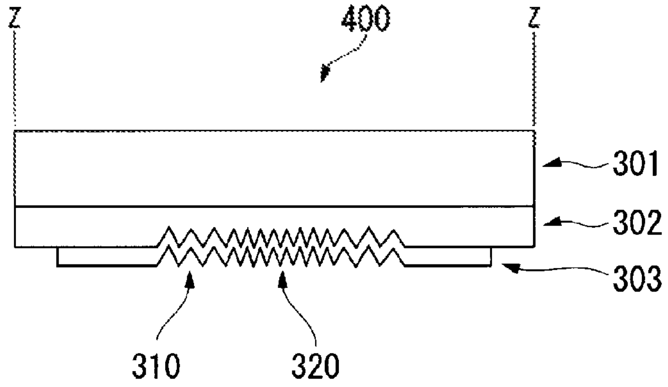
FIG. 5 is a schematic cross-sectional view of the counterfeit prevention medium, sectioned along the Z-Z line of FIG. 4.

Methods for forming uneven structures such as a first uneven structure 310 or a second uneven structure 320 formed in a relief structure formed layer 302 shown in FIGS. 4 and 5 by using a metal stamper include various methods such as radiation curable molding, extrusion molding and thermal press molding.

The first uneven structure 310 may be configured as a uneven structure having a groove like structure including a concave section or a convex section. The uneven structure includes a so-called relief diffraction grating structure or a directivity scattered structure in which a plurality of regions having mutually different directions are formed, each region including a plurality of linear concave sections or convex sections being aligned in the same direction.

Generally, most of diffraction gratings ordinarily used for displays have spatial frequencies within a range from 500 to 1600/mm so that different colors can be displayed with respect to a user observing from a direction, depending on the spatial frequency or the direction of the diffraction grating.

Figures 8, 9:
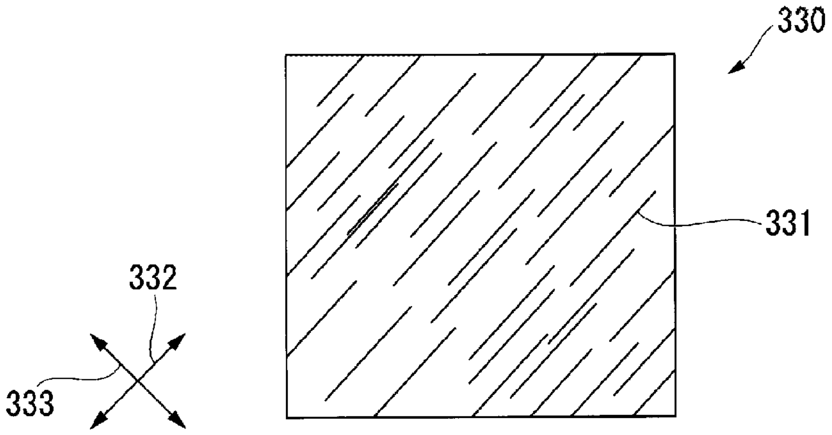
FIG. 8 is a perspective view showing an example of a first uneven structure of the counterfeit prevention medium according to the first embodiment.
FIG. 9 is a diagram showing a configuration example of a captured image data table in the image data storing unit 11, used for an authenticity determination.

The directivity scattered structure includes, as shown in FIG. 8, a plurality of light scattering structures 331 having a constant alignment direction 332 in a specific segment or a cell. The light scattering structures 331 are arranged in substantially parallel in the specific segment or the cell, where each of the structures has a linear shape.

The light scattering structures 331 are not necessarily arranged in complete parallel, but may be arranged such that the longitudinal direction of a part of the light scattering structures 331 crosses the longitudinal direction of other light scattering structures 331, as long as regions of the above-described directivity scattered structure 330 have scattering power having sufficient anisotropy.

According to the above-described structure, in the case where light is irradiated from an oblique direction perpendicular to the alignment direction 332, and when the region formed of the directivity scattered structure 330 is observed from front side, the observed region is likely to be brighter due to higher scattering power. In the case where light is irradiated from an oblique direction perpendicular to the light scattering axis 333, and when the region including the directivity scattered structure 330 is observed from front side, the observed region is likely to be darker due to lower scattering power.

Accordingly, in the segment or the cell including the light scattering structures 331, the alignment direction 332 is arbitrarily set for each segment or cell, whereby a pattern is formed by a combination of relatively bright parts and dark parts, so that light-dark reversion is observed by changing the observation position or the irradiated position of the light.

The above-described first uneven structure 310 can be configured solely by a relief diffraction grating structure or a directivity scattered structure or can be configured by a mixed structure. However, the structure is not limited to these structures.

Figure 6:
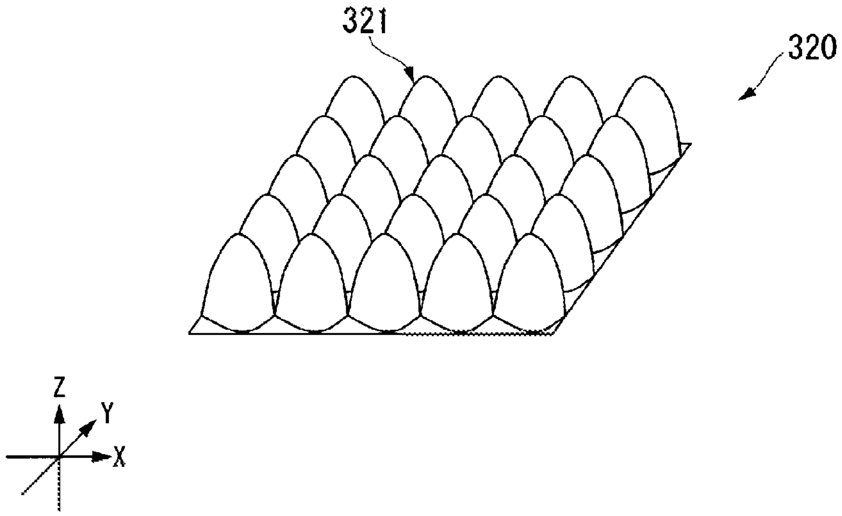
FIG. 6 is a perspective view showing an example of a second ruggedness structure of the counterfeit prevention medium according to the first embodiment.
Figure 7:
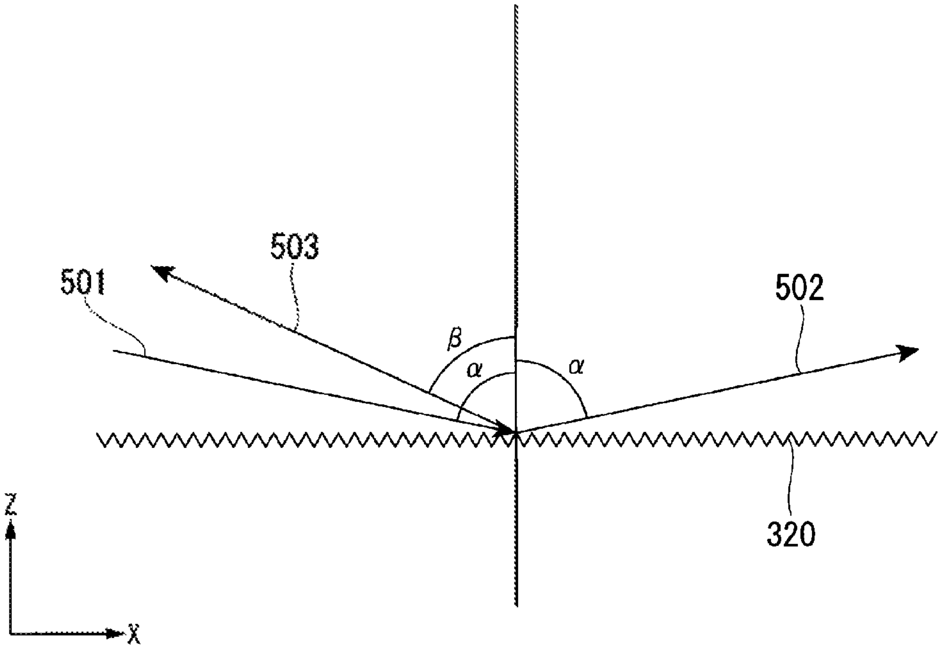
FIG. 7 is a diagram roughly showing the second uneven structure in which diffracted light is emitted therefrom.

FIG. 6 is a perspective view showing an example of a structure applicable to the second uneven structure 320.

The second uneven structure 320 shown in FIG. 6 is provided with a plurality of convex portions. The second uneven structure 320 is formed by only the convex portions 321. This is merely an example, but a plurality of concave portions can be used to form the second uneven structure 320.

The surface area of the second uneven structure 320 according to the present embodiment which is solely formed of concave portions or convex portions is preferably 1.5 times an occupied area required for the concave portions or the convex portions to be arranged on the surface of the relief structure formed layer 302.

By setting the surface area of the concave portions or convex portions to be 1.5 times the occupied area, favorable low reflectivity and scattering properties can be obtained. This is because the color tone of the second uneven structure 320 apparently differs from that of the first uneven structure, and hence the imaging unit 101 easily recognizes the uneven structure when capturing an image. When the surface area of the concave portions or convex portions is less than 1.5 times the occupied area, the reflectivity becomes high. This is not favorable.

As a shape of each of the plurality of concave portions or convex portions in the second uneven structure 320 formed in the relief structure formed layer 302, a forward tapered shape is preferably used. The forward tapered shape is defined such that a cross-sectional area parallel to the substrate surface of the concave or convex portion is decreased towards a tip end from a base end of the concave or convex portion. Specifically, the forward tapered shape may include conical, pyramid, elliptical, columnar or cylindrical, prismatic or rectangular cylindrical, truncated conical, truncated pyramid, or truncated elliptical shapes, a shape where cone is adjoined to column or cylinder, or a shape where a pyramid is adjoined to a prism or rectangle, hemisphere, semi-ellipsoid, bullet, or round-bowl shape.

As shown in FIG. 6, in the case where the center distances of adjacent concave portions or convex portions are constant in the second uneven structure 320, when radiating light to the second uneven structure 320, the second uneven structure 320 emits diffracted light in a specific direction in relation to the travel direction of the incident light 501.

Generally, diffracted light is expressed as an equation below.

$$d(\sin\alpha\pm\sin)=n\lambda \quad (1)$$

In equation (1), d represents the center distance of the concave portions or the convex portions, and $\lambda$ represents the wavelength of the incident light or the diffracted light. Also, $\alpha$ represents the incidence angle of the incident light, and $\beta$ represents the emission angle of the diffracted light. n represents the order, and most typical diffracted light is first-order diffracted light so that n=1 may be established.

The incidence angle $\alpha$ may be the same as the emission angle of zero order diffracted light, that is, regular reflected light. For parameters $\alpha$ and $\beta$, the positive direction is defined as a clockwise direction with respect to the direction normal to the display, that is Z axis shown in FIG. 5. Hence, the equation (1) can be expressed as below.

$$d(\sin\alpha-\sin\beta)=\lambda \quad (2)$$

Accordingly, when the center distances d between the concave portions or the convex portions, and the emission angle $\alpha$ of the zero order diffracted light are taken to be constant, as expressed in the equation (2), the emission angle $\beta$ of the first order diffracted light 503 changes in conformity with the wavelength. Therefore, in the case where the illumination light is white, the color imaged by the imaging unit 101 changes with the change of the observation angle relative to the uneven structure.

The second uneven structure 320 has a forward tapered shape having a center distance of 400 nm or less in the concave portions or the convex portions. Hence, the color of the image when captured in the normal direction appears almost black. However, the emission angle $|\beta|$ of the first order diffracted light 503 against light having specific wavelength can be designed to be close to the incident angle, under a specific condition where the incident angle $\alpha$ of the white light is within a range from 60° to 90°. For example, when $\alpha$=60° and d=340 nm, the emission angle $|\beta|$ when $\lambda$=600 nm is approximately 64°.

In contrast, since the first uneven structure 310 is a so-called diffraction grating structure or the like, setting the emission angle of the first order diffracted light to be close to the incident angle is difficult to achieve.

Accordingly, in an identification operation of the authenticity determination device 1, when the light source 200 and the imaging unit 101 are comparatively disposed closely to each other, a clear change in the color of the second uneven structure 320 can be captured under a specific condition.

The counterfeit prevention medium 400 may have a configuration using a surface plasmon propagation produced by a fine structure such as nano-meter size fine holes provided on the surface thereof; or a configuration using a structural color in which depth of the uneven structure is controlled to control the color of the reflected light against the incident light or the transmitted light.

The counterfeit prevention medium 400 may have a configuration using retro-reflection properties due to micro spheres or a spherical structure; a configuration like an angle-controlled mirror in which an inclination is imparted to a surface structure of a micro region so as to obtain reflective properties, thereby allowing the incident light to be reflected or transmitted towards only a specific direction; and a configuration like printed products having a uneven structure produced by letterpress printing.

Further, the counterfeit prevention medium 400 may have, for example, a configuration in which a large number of walls with some height used for a peep-preventive film or the like are disposed in a narrow area so as to limit the vision; a configuration using a parallax barrier method in which thin lines are provided on a surface at specific intervals to limit vision, whereby the image formed deep inside the surface appears to be changed; and a configuration using lenticular lens or microlens arrays, whereby the image formed deep inside the lens appears to be changed.

The counterfeit prevention medium 400 may have a configuration provided with a pearl pigment printed thereon, in which metal oxide is coated on mica.

The counterfeit prevention medium 400 may have, for example, a configuration using a multi-layered thin film in which a plurality of thin films having different refractive indexes composed of a transparent material or a metal are provided to produce a change in the color depending on the reflection angle and the transmission angle of the incident light due to interference phenomenon; a configuration using a printing technique in which a multi-layered thin films are crushed into flake shapes to produce a pigment used for printing; a configuration using printed particles where micro particles producing interference phenomenon are coated with thin film by chemical processing; and a configuration in which a liquid crystal material represented by cholesteric liquid crystal is immobilized in polymer or the like. The liquid crystal material may include a material provided on a surface, or a material crushed into pigment used for printing.

The counterfeit prevention medium 400 may have, for example, a configuration using a magnetic field orientation material in which a magnetic substance such as iron oxide, chromium oxide, cobalt and ferrite is aligned on a surface to impart directivity to the reflective light and transmission light; a configuration of a multi-layered film provided using the above-described magnetic field orientation material as a core and additionally performing chemical processing or the like mentioned above; and a configuration using an optical effect produced by nano-meter sized particles represented by silver nano particles or quantum dots.

Referring back to FIG. 3, the normal line 350 indicates a surface direction of the surface 300A of the credit card 300. The observation angle at is an angle formed between the imaging direction 101A of the imaging unit 101 and the normal line 350. For example, the observation angle estimating unit 105 places the credit card in a three-dimensional space such that edges of the credit card 300 are parallel to the respective x-axis and y-axis when the z-axis is defined as a direction parallel to the normal line 350. For example, the credit card 300 is arranged on a two-dimensional plane defined by the x-axis and y-axis in the three-dimensional coordinate system, such that any one of the apexes formed by the edges of the credit card 300 corresponds to the origin O of the three-dimensional coordinate. Hence, the thickness direction of the credit card 300 is parallel to the z-axis. The three-dimensional shape of the credit card 300 is stored, as known information in advance, in the image data storing unit **11*l*** together with the above coordinate conversion equation.

The observation angle estimating unit 105 reads each captured image data from the image data storing unit 111, when obtaining the observation angle of the captured image data, and correlates the three-dimensional coordinates of the credit card 300 in the three-dimensional coordinate system, with respective pixels (coordinates) of the captured image (two-dimensional coordinate system) by using the above-described coordinate conversion equation, thereby calculating captured positions of the captured image data in the three-dimensional coordinate system, and the imaging direction of the captured image data with respect to the captured positions. At this time, as described above, the observation angle estimating unit 105 disposes the credit card 300 in the three-dimensional space such that the normal line 350 is parallel to the z-axis, and the edges are parallel to the respective x-axis and y-axis, with an origin being any one of the apexes of the credit card 300 in the three-dimensional shape.

The observation angle estimating unit 105 calculates, with respect to the three-dimensional shape of the credit card 300, a captured position and an imaging direction of the captured image data of the imaging unit 101 in the three-dimensional coordinate system. Thus, the observation angle estimating unit 105 calculates an observation angle α formed between the normal line 350 and the imaging direction of the imaging unit 101. The observation angle estimating unit 105 writes and stores the calculated observation angle, the observation position, and the address of the captured image data into the captured image data table of the image data storing unit 111, together with the captured image data identification information of the captured image data.

According to the present embodiment, a camera-calibration has to be performed for the imaging unit 101 in advance. The camera calibration is performed such that a calibration board with an already-known three-dimensional shape is imaged once or multiple times in an imaging region, and one or more captured image data are used to produce a correlation between coordinate points in the three-dimensional coordinate system and coordinate points of the captured image data in the two-dimensional coordinate system (two-dimensional pixels). Thus, the above-described coordinate conversion equation representing a relative positional relationship between the imaging unit 101 and the calibration board (hereinafter referred to as external parameters), an optical center of the imaging unit 101, light-incident direction vector of each of pixels (two-dimensional pixel) and lens distortion (hereinafter referred to as internal parameters of imaging unit 101) are estimated.

In other words, according to the present embodiment, since the observation angle estimation unit 105 which will be described later estimates the observation angle of the captured image data, a global coordinate system (three-dimensional coordinate system) is re-configured based on the two-dimensional image of the calibration board captured from a plurality of different view points by the imaging unit 101 in advance, that is, based on captured image data of multiple viewpoints. The coordinate conversion equation is acquired when the camera calibration is performed, the coordinate conversion equation indicating a correlation between the coordinate points in the three-dimensional coordinate system re-configured in the same pixels, and the coordinate points of the captured image data captured by the imaging unit 101 in the two-dimensional coordinate system.

As described above, in the estimation process of the observation angle of the present embodiment, a camera calibration is performed in advance to the imaging unit 101. Hence, internal parameters in the imaging unit 101 are already known at the time when the authenticity is determined for the counterfeit prevention medium in the identification system, and also the three-dimensional shapes of the object of the authenticity determination and the counterfeit prevention medium are already known. Accordingly, the image data of the counterfeit prevention medium is captured from a plurality of different positions and the above-described coordinate conversion equation is used so as to obtain information on a plurality of corresponding points between the coordinate points in the three-dimensional coordinate system and the pixels of the captured image data in the two-dimensional coordinate system. Thus, the relative positional relationship between the imaging unit 101 and the counterfeit prevention medium can be estimated. Similarly, in the case where the counterfeit prevention medium is captured only once, information on a plurality of corresponding points is obtained by using the above-described coordinate conversion equation for one captured image data, the corresponding point information being defined between the coordinate points in the three-dimensional coordinate system and the pixels in the two-dimensional coordinate system. In accordance with a plurality of corresponding coordinates, relative positional relationship between the imaging unit 101 and the counterfeit prevention medium can be estimated. That is, the observation position and the observation angle (imaging direction) of the imaging unit 101 when capturing an image of the counterfeit prevention medium can be estimated.

In the present embodiment, for a camera calibration, a well-known analysis method, for example, Z. Zhang, "A flexible new technique for camera calibration", IEEE Transactions on Pattern Analysis and Machine Intelligence, Vol. 22, No. 11, pages 1330-1334, 2000 can be applied so that the observation angle when capturing the captured image data can be estimated. However, when the analysis method of Z-Zhang is used for estimating the observation angle, the captured image data outputted to the identification system has to be the image data captured with a focus similar to (preferably the same focus as) the fixed focus when the camera calibration is performed.

Referring back to FIG. 1, the available image selection unit 106 selects, among captured image data captured by the imaging unit 101, captured image data available for authenticity determination. The available image selection unit 106 determines, when selecting captured image data available for the authenticity determination from the captured image data captured by the imaging unit 101, whether the observation angle of the captured image data is within an authenticity determinable angle. The available image selection unit 106 determines, for example, whether the entire shape of the counterfeit prevention medium 400 has been captured in the captured image data or focused, or the luminance histogram (described later) is appropriate.

The available image selection unit 106 selects captured image data in which the observation angle is in the authenticity determinable angle as captured image data available for authenticity determination. The available image selection unit 106 adds determination image data identification information to the selected captured image data and writes and stores the captured image data together with the captured image data identification information of the captured image data, into an authenticity determination captured image data table in the image data storing unit 111.

FIG. 9 is a diagram showing a configuration example of the authenticity determination captured image data table in the image data storing unit 111. In the authenticity determination captured image data table shown in FIG. 9, determination image data identification information, determination image data identification information, captured image data of the captured image data indicated by the determination image data identification information, a reference image data address pointing the start address in a region storing the reference image data, and dissimilarity between captured image data and reference image data, are written and stored, being correlated to each other.

In the authenticity determination captured image data table, the determination image data identification information identifies captured image data available for authenticity determination. The captured image data identification information identifies the captured image data. The reference image data address points each address of a region of the image data storing unit 111 in which captured image data is stored, serving as an index when reading the reference image data from the image data storing unit 111. The reference image data stored in the reference image data address serves as a reference image data to be compared with corresponding captured image data. The dissimilarity value is a numeric value representing a degree of dissimilarity (and similarity) between the captured image data and the reference image data.

Referring back to FIG. 1, the reference image generation unit 107 generates the reference image data used for a comparison with the selected captured image data selected by the available image selection unit 106. The reference image data is an image data observed from the same observation angle as the captured image data, and is calculated by a simulation corresponding to the structure of the counterfeit prevention medium 400, or from the captured image data of the counterfeit prevention medium 400 captured in advance. As described above, the counter prevention medium 400 has various embodiments. Theses embodiments include ones to which a simulation can be readily applied or ones to which a simulation is difficult to be applied.

Accordingly, the reference image generation unit 107 generates the reference image data for the respective above-described cases. For example, in the case where the counterfeit prevention medium 400 is configured to have a diffraction structure of which simulation can readily be performed, the reference image data is generated as a calculation through simulation by using a reference image generation function that takes the observation angle as being a parameter, based on the design information of the diffraction structure. The reference image generation unit 107 writes and stores the generated reference image data into the image data storing unit 111, and sets the start address of a region to which the generated reference image data is written, to be the reference image data address. The reference image generation unit 107 writes and stores the above-described reference image data address into the authenticity determination captured image data table in the image data storing unit 111, being correlated to the captured image identification information of the captured image data to be compared.

In the case where a material and a structure have large variations when being formed so that the reference image is difficult to uniquely determine even if the observation angle is set, and the reference image is difficult to generate through a simulation based on theory or design information, images of the counterfeit prevention medium 400 are captured from various observation angles, and the captured image data is formed into a database as reference image data in the image data storing unit 111. Thus, the reference image generation unit 107 may read the reference image data corresponding to the observation angle of the captured image data to be compared, and may write/store the reference image data into the authenticity determination captured image data table, being correlated to the captured image data identification information of the captured image data to be compared.

The similarity calculating unit 108 refers to the authenticity determination captured image data table in the image data storing unit 111, and sequentially reads the captured image data identification information and the reference image data address corresponding to the determination image data identification information. The similarity calculating unit 108 reads the captured image data address corresponding to the captured image data identification information, from the captured image data table in the image data storing unit 111. As a result, similarity calculating unit 108 reads, from the captured image data storing unit 111, the captured image data corresponding to the captured image data address and the reference image data corresponding to the reference image data address.

The similarity calculating unit 108 calculates a dissimilarity of the captured image data to the read out reference image data by using a template matching. For example, the similarity calculating unit 108 calculates a mean square error in the luminance of each pixel (each of R/GB (red, green, blue) when a color image is used) corresponding to the captured image data and to the reference image data, accumulates the mean square error of all the pixels or part of corresponding pixels, and outputs the accumulation result as a numeric value showing the dissimilarity. Hence, the lower the dissimilarity value is, the higher the similarity is between the captured image data and the reference image data. As a part of corresponding pixels, a pixel portion having characteristic light pattern is selected and used, in which the pixel portion is significantly different from other pixels in the reference image data, depending on the observation angle.

The similarity calculating unit 108 may convert RGB value of all pixels or a part of corresponding pixels in the captured image data and the reference image data, into an appropriate color space. Then, the sum of the squares of Euclidian distances in the color space may be calculated, and the result of the sum may be outputted as a value indicating the dissimilarity. Similar to the case using the mean square errors, the lower the dissimilarity value is, the higher the similarity is between the captured image data and the reference image data.

As described above, the similarity calculating unit 108 sequentially processes determination image data identification information of the authenticity determination captured image data table in the image data storing unit 11, and calculates a dissimilarity between the captured image data and the corresponding reference image data. The similarity calculating unit 108 correlates the calculated dissimilarity with the captured image data identification information of the captured image data from which the dissimilarity is calculated, and writes and stores the calculated dissimilarity into the authenticity determination captured image data table in the image data storing unit 111.

In the case where the intensity of the illumination light when capturing the image data (captured image data) is not correlated to the reference image data, simple pixel comparison cannot be achieved.

Hence, a configuration may be used in which the R/GB hue is evaluated between predetermined pixels, that is, the mean square error is calculated between R/G (ratio of R gradient and G gradient) in predetermined pixels of the captured image data and R/G in the pixels of the reference image data corresponding to the captured image data, and difference in the intensity of the illumination light is absorbed to calculate highly accurate dissimilarity. 'Between predetermined pixels' refers to that pixel A and pixel B corresponding to two points are paired, and R/G is calculated as a ratio where the R gradient of pixel A is divided by G gradient. Alternatively, B/G ratio (ratio between B gradient and G gradient) may be combined with R/G ratio. It should be noted that, regarding 'between predetermined pixels', pixels A and B of two points are paired to obtain R/G as a ratio of that R gradient of the pixel A is divided by the G gradient of the pixel B. For 'between predetermined pixels', combination of pixels having large R/G and B/G are set in advance.

The authenticity determination unit 109 reads dissimilarities corresponding to all of the determination image data identification information in the authenticity determination captured image data table of the image data storing unit 111. The authenticity determination unit 109 compares each of the dissimilarities corresponding to all read-out determination image data identification information with a predetermined dissimilarity threshold. The dissimilarity threshold is calculated and set in advance. The dissimilarity threshold is calculated by calculating a dissimilarity, with a plurality of observation angles, between the captured image data captured in an arbitrary angle (within an angle range which will be described later) and the reference image data obtained corresponding to the observation angle of the captured image data. The dissimilarity threshold is set in advance as an experiment value for every observation angle so as to exceed the dissimilarity between the captured image data and the reference image data. A different dissimilarity threshold is calculated for every calculation angle, and the authenticity determination unit 109 uses the dissimilarity threshold corresponding to the observation angle to perform an authenticity determination of a counterfeit prevention medium.

The authenticity determination unit 109 calculates a dissimilarity in one or more captured image data, and determines a credit card 300 (object for authenticity determination) to which a counterfeit prevention medium 400 is added, to be counterfeit (fake) if only the dissimilarity of one captured image data exceeds the dissimilarity threshold. The authenticity determination unit 109 obtains dissimilarities for one or more captured image data, and determines that the credit card (object for authenticity determination) 300 to which the counterfeit prevention medium 400 has been added is true (genuine), when all of the dissimilarities are less than the dissimilarity threshold.

The display unit 110 is configured of, for example, a liquid crystal display, and displays images on the display screen thereof.

In the image data storing unit 111, the above-described captured image data, reference image data, captured image data table and the authenticity determination captured image data table are written and stored.

The imaging control unit 102 determines whether the observation angle when capturing an image of the counterfeit prevention medium is within a predetermined angle range. The angle range refers to a range of angle enabling observation in a diffraction grating or a hologram, where the color or the patterns vary depending on the observation angle. When the observation angle is out of the angle range, the reference image data, where corresponding color or the light pattern is captured, cannot be generated accurately. Hence, authenticity determination cannot be performed accurately for the counterfeit prevention medium.

At this moment, the imaging control unit 102 causes the observation angle estimating unit 105 to estimate the observation angle which is the imaging direction of the imaging unit 101. The imaging control unit 102 displays information on the display screen so as to prompt the user to adjust the angle range. The information indicates that an angle condition in the imaging process is satisfied when the observation angle estimated by the observation angle estimating unit 105 is within an angle range, and that an angle condition in the imaging process is not satisfied when the estimated observation angle is not within the angle range.

The imaging control unit 102 determines whether the imaging unit 101 when capturing images satisfies a capturing condition for capturing captured image data having a quality comparable with the reference image data. As a capturing condition, it is detected whether the focus distance in the imaging unit 101 is similar to the focus distance used when the coordinate conversion equation is generated. The imaging control unit 102 displays information on the display screen so as to prompt the user to adjust the focus distance. The information indicates that the capturing condition is satisfied when the currently-set focus distance is similar to the focus distance used for generating the coordinate conversion equation, and that the capturing condition is not satisfied when the currently-set focus distance is different from the focus distance used for generating the coordinate conversion equation. Also, an exposure condition in the image capturing may include, as needed, presence/absence of illumination or intensity of the illumination.

The imaging control unit 102 generates, as a capturing condition, a luminance histogram when the exposure condition in the imaging unit 101 is set. The imaging control unit 102 indicates a gradient distribution of pixels using the generated luminance histogram as a basis, for a determination whether the gradient distribution in the captured image data inclines to a high gradient region or a low gradient region. For example, when the gradient distribution in the luminance histogram inclines to the low gradient region, that is, when the gradient is expressed by 256 steps of from 0 to 255 and there are lots of pixels having gradient near 0 in the captured image data, black defects occur in the captured image data, so that the captured image data cannot be compared with the reference image data. When the gradient distribution in the luminance histogram inclines to the high gradient region, that is, when there are lots pixels having gradient near 255 in the captured image data, halation occurs in the captured image data, so that the captured image data cannot be compared with the reference image data.

Therefore, in the luminance histogram, the exposure condition has to be set such that the gradient level falls in the proximity of the center of the gradient range from 0 to 255.

The imaging control unit 102 determines, based on the gradient distribution of the luminance histogram, whether the illumination is required to be adjusted. When the black defects are expected to appear and the illumination is required to be adjusted to shift the distribution of the luminance histogram to the high gradient region, the imaging control unit 102 controls the exposure control unit 103 so that the lighting unit 104 can illuminate the counterfeit prevention medium 400 (e.g., radiate flash light in the imaging direction) with a predetermined intensity during the image capturing. Also, when the authenticity determination device 1 does not have the exposure control unit 103 and the lighting unit 104, the imaging control unit 102 displays, on the display screen of the display unit 110, information prompting the user to irradiate the illumination having necessary light intensity to the counterfeit prevention medium 400.

When halation is expected to occur and the illumination is required to be adjusted to shift the distribution of the luminance histogram to the low gradient region, the imaging control unit 102 controls the exposure control unit 103 so that the lighting unit 104 does not illuminate the counterfeit prevention medium 400, or can illuminates the counterfeit prevention medium 400 with a predetermined intensity during the image capturing. The imaging control unit 102 displays, on the display screen of the display unit 110, information prompting the user to lower the ambient illumination intensity of the current counterfeit prevention medium 400, in order to irradiate the illumination having required light intensity to the counterfeit prevention medium 400.

In the above-described processes, an exposure control table may be prepared, including distributions of luminance histogram, and control conditions, such as exposure conditions and intensities of illumination, corresponding to the respective distributions, and the table may be written/stored into the image data storing unit 111 in advance. In this case, the imaging control unit 102 searches a luminance histogram similar to the luminance histogram pattern of the image data to be captured from the exposure control table in the image data storing unit 111, reads the information on the control condition, such as the exposure condition and the intensity of illumination, of the image data to be captured, and displays the control condition on the display screen of the display unit 110.

An illuminance sensor may be provided for the exposure control unit 103, and the exposure condition and the degree of illuminance may be set, based on the illuminance detected by the illuminance sensor. Here, an exposure control table may be prepared, including illuminances and control conditions, such as exposure conditions and intensities of illumination, corresponding to the respective illuminances, and the table may be written/stored into the image data storing unit 111 in advance. In this case, the imaging control unit 102 searches through the exposure control table in the image data storing unit 111, finding correlation with the illuminance in capturing the image data, to read the control condition, such as the exposure condition and the intensity of illumination, of the image data to be captured, and displays the control condition on the display screen of the display unit 110 as described above.

Figure 10:
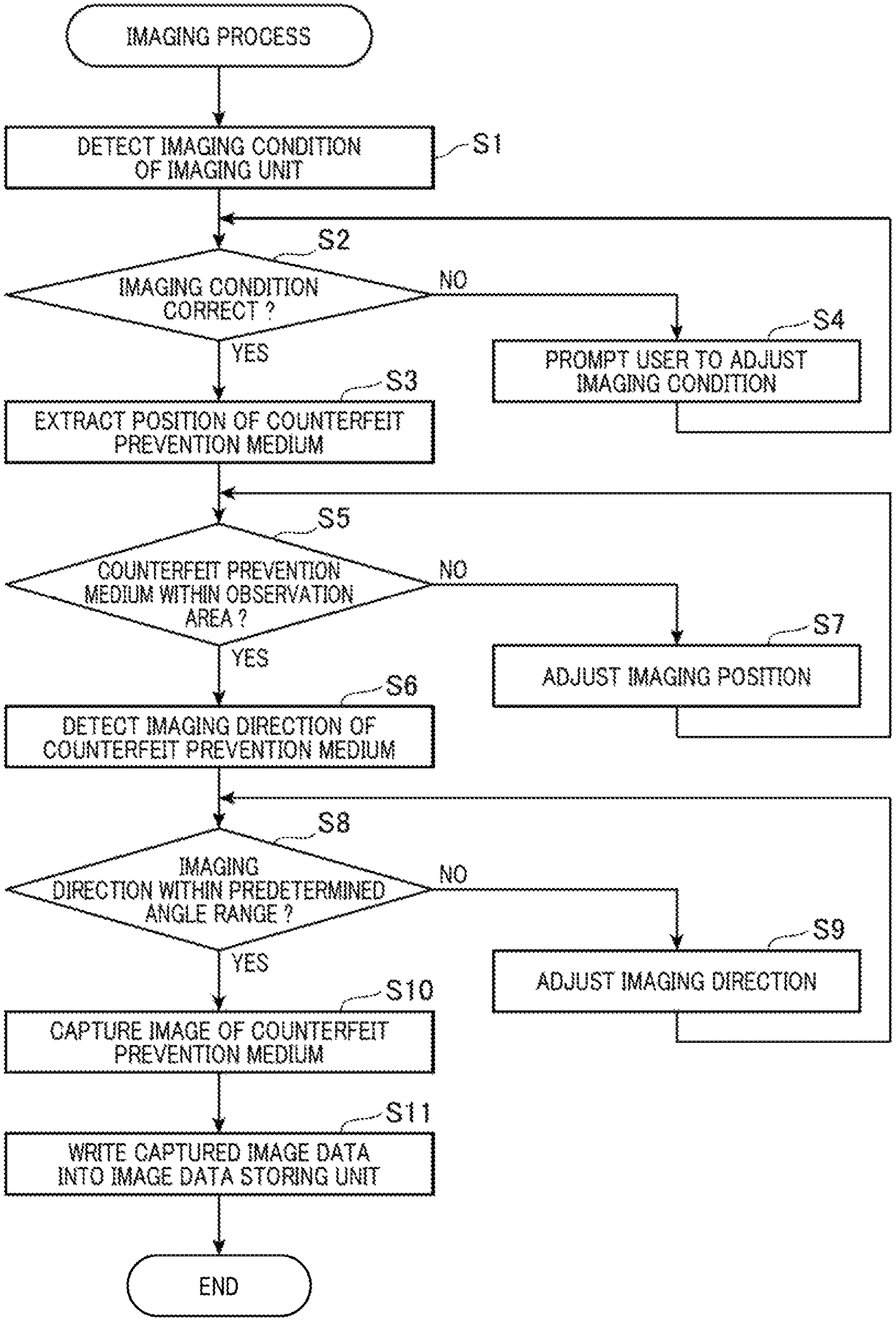
FIG. 10 is a flowchart for an operation example of capturing image data used for authenticity determination processing of an object, using the counterfeit prevention determination medium in the identification system according to the first embodiment.

FIG. 10 is a flowchart for an operation example of capturing image data used for authenticity determination processing of an object using a counterfeit prevention determination medium in the identification system according to the first embodiment.

Step S1:

The imaging control unit 102 detects current imaging conditions in the imaging unit 101 for the authenticity determination object, the imaging conditions including an observation angle, a focus distance, an exposure condition.

Step S2:

The imaging control unit 102 determines whether all of the imaging conditions such as the focus distance and the exposure condition satisfy the imaging conditions of the captured image data having a quality comparable with the reference image data.

At this time, the imaging control unit 102 proceeds to step S3, when the imaging conditions satisfy the imaging condition of the captured image data having a quality comparable with the reference image data. On the other hand, the imaging control unit 102 proceeds to step S4 when the the imaging conditions do not satisfy the imaging condition of the captured image data having a quality comparable with the reference image data.

Step S3:

The imaging unit 102 extracts an imaging position of the counterfeit prevention medium 400 in the captured image data. In other words, the imaging unit 102 obtains a three-dimensional shape of a credit card (authenticity determination object) 300 within an imaging area of the imaging unit 101. The imaging unit 102 compares the three-dimensional shape of the obtained credit card 300 with the three-dimensional shape of the credit card, 300 stored in advance, and extracts a region of the counterfeit prevention medium 400 within an imaging area of the imaging unit 101.

Step S4:

The imaging unit 102 displays, on the display screen of the display unit 110, the conditions not satisfying the imaging conditions, prompting the user to adjust the conditions which are not satisfied.

Step S5:

The imaging unit 102 compares the counterfeit prevention medium 400 in the imaging area of the imaging unit 101 with the counterfeit prevention medium 400 in the three-dimensional shape of the credit card 300. The imaging unit 102 determines whether the entire counterfeit prevention medium 400 is present in an imaging direction in which the image data is captured, that is, whether the observation angle is within a predetermined angle range set in advance.

The imaging unit 102 proceeds to step S6 when the observation angle of the imaging unit 101 is present in the angle range, and proceeds to step S7, when the observation angle of the imaging unit 101 is not present within the angle range.

Step S6:

The imaging unit 102 causes the observation angle estimating unit 105 to perform an estimation process of estimating an imaging direction, that is, an observation angle of the counterfeit prevention medium 400.

Thus, the observation angle estimating unit 105 compares the three-dimensional shape of the credit card 300 obtained from the captured image data in the imaging area of the imaging unit 101, with the three-dimensional shape of the credit card 300 in the three-dimensional coordinate stored in advance, thereby estimating the observation angle of the counterfeit prevention medium 400. With the above comparison result, the observation angle estimating unit 105 calculates the imaging direction in which the credit card 300 is captured by the imaging unit 101. The observation angle estimating unit 105 obtains, as an observation angle, an angle formed between the line normal to a surface of the credit card 300 onto which the counterfeit prevention medium 400 is attached (either the upper surface of the credit card 300) or the lower surface onto which the counterfeit prevention medium 400 is attached) in the three-dimensional coordinate, and the imaging direction of the imaging unit 101, and outputs the observation angle to the imaging control unit 102.

Step S7:

The imaging unit 102 displays information on the display screen of the display unit 110 for adjustment of the imaging position of the imaging unit 101, and prompts the user to change the imaging position, so that the region of the counterfeit prevention medium 400 is entirely located within the imaging area of the imaging unit 101.

Step S8:

The imaging control unit 102 determines whether the entire counterfeit prevention medium 400 is present in an imaging direction in which the image data is captured, that is, whether the observation angle is within a predetermined angle range set in advance.

The imaging unit 102 proceeds to step S10 when the observation angle of the imaging unit 101 falls in the angle range, and proceeds to step S9, when the observation angle of the imaging unit 101 does not fall within the angle range.

Step S9:

The imaging unit 102 displays information on the display screen of the display unit 110 for adjustment of the imaging direction of the imaging unit 101, and prompts the user to change the imaging direction, so that the observation angle of the imaging unit 101 is within the predetermined angle range.

Step S10:

The imaging control unit 102 displays an image on the display screen of the display unit 110, indicating that an image of the counterfeit prevention medium 400 can be captured, and prompts the user to capture an image of the counterfeit prevention medium 400.

The user confirms the display screen inputs an imaging command into the input portion (not shown) of the authenticity determination device 1.

Thus, the imaging control unit 102 causes the imaging unit 101 to perform an imaging process to obtain captured image data.

Step S11:

The imaging control unit 102 adds captured image data identification information to the captured image data, and writes/stores the captured image data into the image data storing unit 111 together with a captured image data address pointing to a region in which the captured image data is written.

Figure 11:
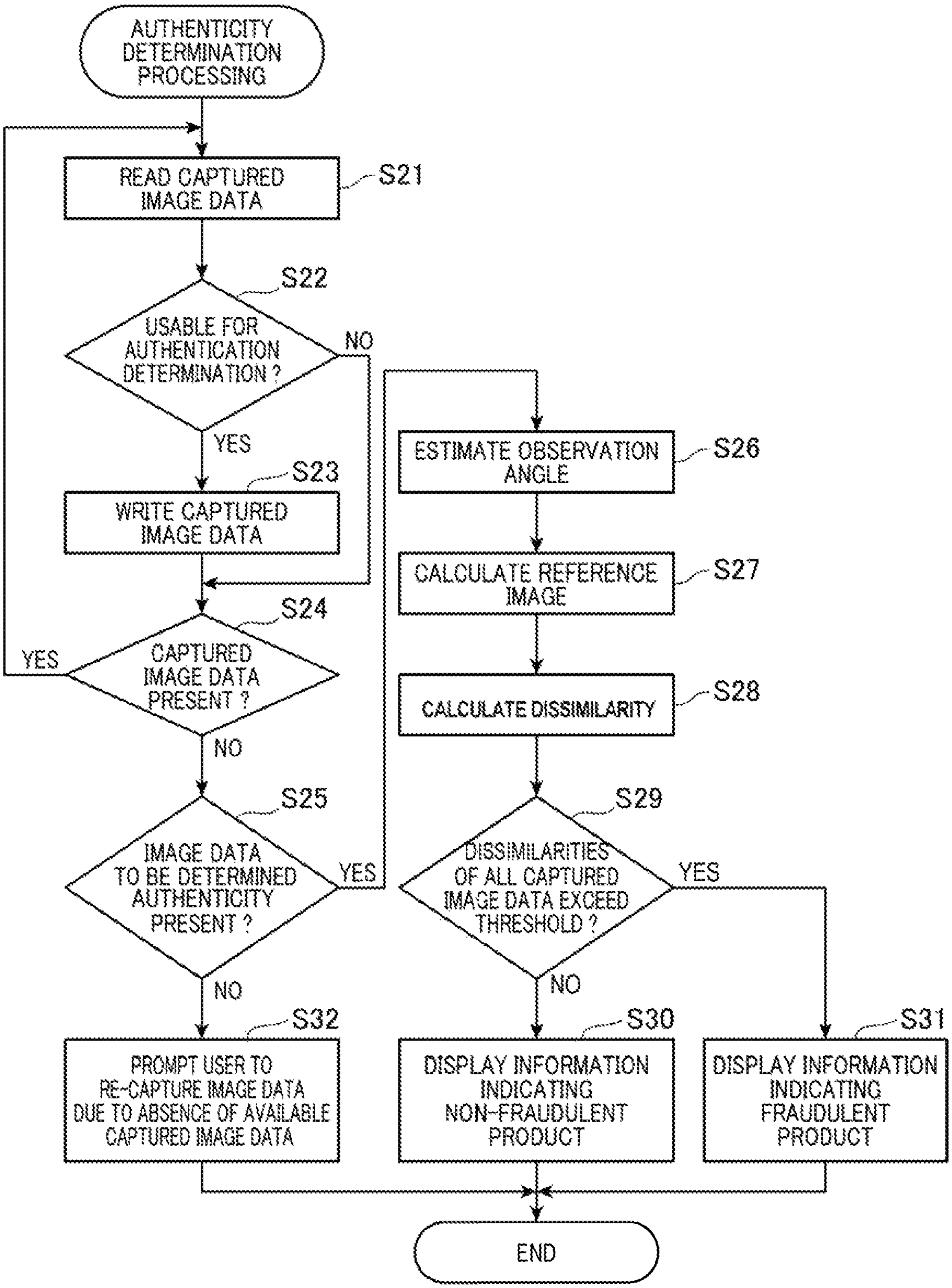
FIG. 11 is a flowchart for an operation example of authenticity determination processing of an object, using the counterfeit prevention determination medium in the identification system according to the first embodiment.

FIG. 11 is a flowchart for an operation example of authenticity determination processing of an object using a counterfeit prevention determination medium in the identification system according to the first embodiment.

Step S21:

The available image selection unit 106 sequentially reads captured image data addresses from the captured image data table. The available image selection unit 106 sequentially reads, using the captured image data, the captured image data from the captured image data storing unit 111 to determine whether the captured image data is comparable with the reference image data.

Step S22:

The available image selection unit 106 determines whether each of the readout captured image data is comparable with the reference image data.

For example, the available image selection unit 106 determines whether the entire shape of the counterfeit prevention medium 400 has been captured in the captured image data, or the medium 400 has been focused, or distribution of the luminance histogram is appropriate. At this time, the available image selection unit 106 proceeds to step S23 when the captured image data can be compared with the reference image data, and proceeds to step S24 when the captured image data cannot be compared with the reference image data.

Step S23:

The available image selection unit 106 adds determination image data identification information to the captured image data, when comparison is determined to be possible. The available image selection unit 106 writes and stores the determination image data identification information together with the captured image data identification information of the captured image data into an authenticity determination captured image data table in the image data storing unit 111.

Step S24:

The available image selection unit 106 determines whether there is (remains) captured image data not yet subjected to the comparison determination process in the captured image data table of the image data storing unit 111. At this time, the available image selection unit 106 proceeds to step S21 when there remains captured image data without being subjected to the comparison determination process, and proceeds to step S25 when there remains no captured image data yet to be subjected to the comparison determination process.

Step 25:

The available image selection unit 106 detects whether the captured image data as the determination image data is present in the authenticity determination captured image data table in the image data storing unit 111. At this time, the available image selection unit 106 proceeds to step S26 when the captured image data used for the authenticity determination is present in the authenticity determination captured image data table, and proceeds to step S32 when the captured image data used for the authenticity determination is not present in the authenticity determination captured image data table.

Step S26:

The observation angle estimating unit 105 sequentially reads the captured image data identification information from the authenticity determination captured image data table of the image data storing unit 111. The observation angle estimating unit 105 reads the captured image data address corresponding to the captured image data identification information from the captured image data table. The observation angle estimating unit 105 reads the captured image data from the image data storing unit 111 using the captured image data address as a basis, to calculate the observation angle for every captured image in the three-dimensional coordinate and output the observation angle to the reference image generation unit 107.

Step S27:

The reference image generation unit 107 generates, based on the observation angle of the captured image data, the reference image data corresponding to each of the captured image data through predetermined simulation or the like.

The reference image generation unit 107 writes the generated reference image data into the image data storing unit 111. Also, the reference image generation unit 107 writes and stores the address at which the generated reference image data is written, into the authenticity determination captured image data table, as the reference image data address.

Step S28:

The similarity calculating unit 108 sequentially reads the captured image data identification information from the authenticity determination captured image data table of the image data storing unit 111. The similarity calculating unit 108 reads the captured image data address corresponding to the read-out captured image data identification information, from the captured image data table of the image data storing unit 111, and reads the captured image data corresponding to the captured image data address, from the image data storing unit 111. Also, the similarity calculating unit 108 reads the reference image data address from the authenticity determination captured image data table, and reads the reference image data, using the reference image data address as a basis, from the image data storing unit 111.

The similarity calculating unit 108 calculates the dissimilarity of the captured image data to the reference image data by using template matching. The similarity calculating unit 108 correlates the calculated dissimilarity with the captured image data identification information for storage and writing into the authenticity determination captured image data table.

Step S29:

The authenticity determination unit 109 sequentially reads dissimilarities from the authenticity determination captured image data table of the image data storing unit 111, and determines whether each of the dissimilarities is less than the dissimilarity threshold set in advance.

The authenticity determination unit 109 determines whether the dissimilarity of all the captured image data indicated by the captured image data identification information in the authenticity determination captured image data table is less than the dissimilarity threshold. At this time, the authenticity determination unit 109 determines the counterfeit prevention medium is true and the object to be determined for authenticity is a non-fraudulent product (genuine), when the dissimilarities of all of the captured image data indicated by the captured image data identification information in the authenticity determination captured image data table are less than the dissimilarity threshold, and proceeds to step S30. On the other hand, the authenticity determination unit 109 determines that the counterfeit prevention medium is counterfeit (fake) and the object to be determined for authenticity is a fraudulent product, when data having a dissimilarity of not less than the dissimilarity threshold is present in the captured image data indicated by the captured image data identification information in the authenticity determination captured image data table, and allows the processing to proceed to step S31.

Step S30:

The authenticity determination unit 109 displays an image on the display unit 110 indicating that the object to be determined for authenticity is a non-fraudulent product. The authenticity determination device 1 terminates the authenticity determination process.

Step S31:

The authenticity determination unit 109 displays an image on the display unit 110 indicating that the object to be determined for authenticity is a fraudulent product. The authenticity determination device 1 terminates the authenticity determination process.

Step S32:

Since the available image selection unit 106 has no captured image data available for authenticity determination, the available image selection unit 106 displays on the display unit 110, prompting the user to newly capture image data and perform the authenticity determination again. The authenticity determination device 1 terminates the authenticity determination process.

According to the above-described configurations of the present embodiment, captured image data of the counterfeit prevention medium is compared with the reference image data which is a genuine image of the counterfeit prevention medium at the observation angle of the captured image data to determine whether the counterfeit prevention medium is genuine or fake. Accordingly, without using a conventionally used special authenticity determination device, and without depending on the disposition condition of the counterfeit prevention medium, authenticity of the counterfeit prevention medium (genuine or fake) can readily be determined by capturing an image of the counterfeit prevention medium with a simple image capturing device such as general purpose digital camera.

Second Embodiment

Hereinafter, with reference to the drawings, a second embodiment of the present invention will be described.

An identification system of the second embodiment is similar to the identification system of FIG. 1 in the first embodiment. In the first embodiment, the authenticity determination is performed even when only one captured image is available for authenticity determination. However, according to the second embodiment, the authenticity determination is performed only when the number of captured image data available for the authenticity determination is more than or equal to a predetermined number. Each of the required number of captured image data has to be captured at a different observation angle. The imaging process is executed, similarly to the first embodiment, in accordance with the flow chart shown in FIG. 10.

Figure 12:
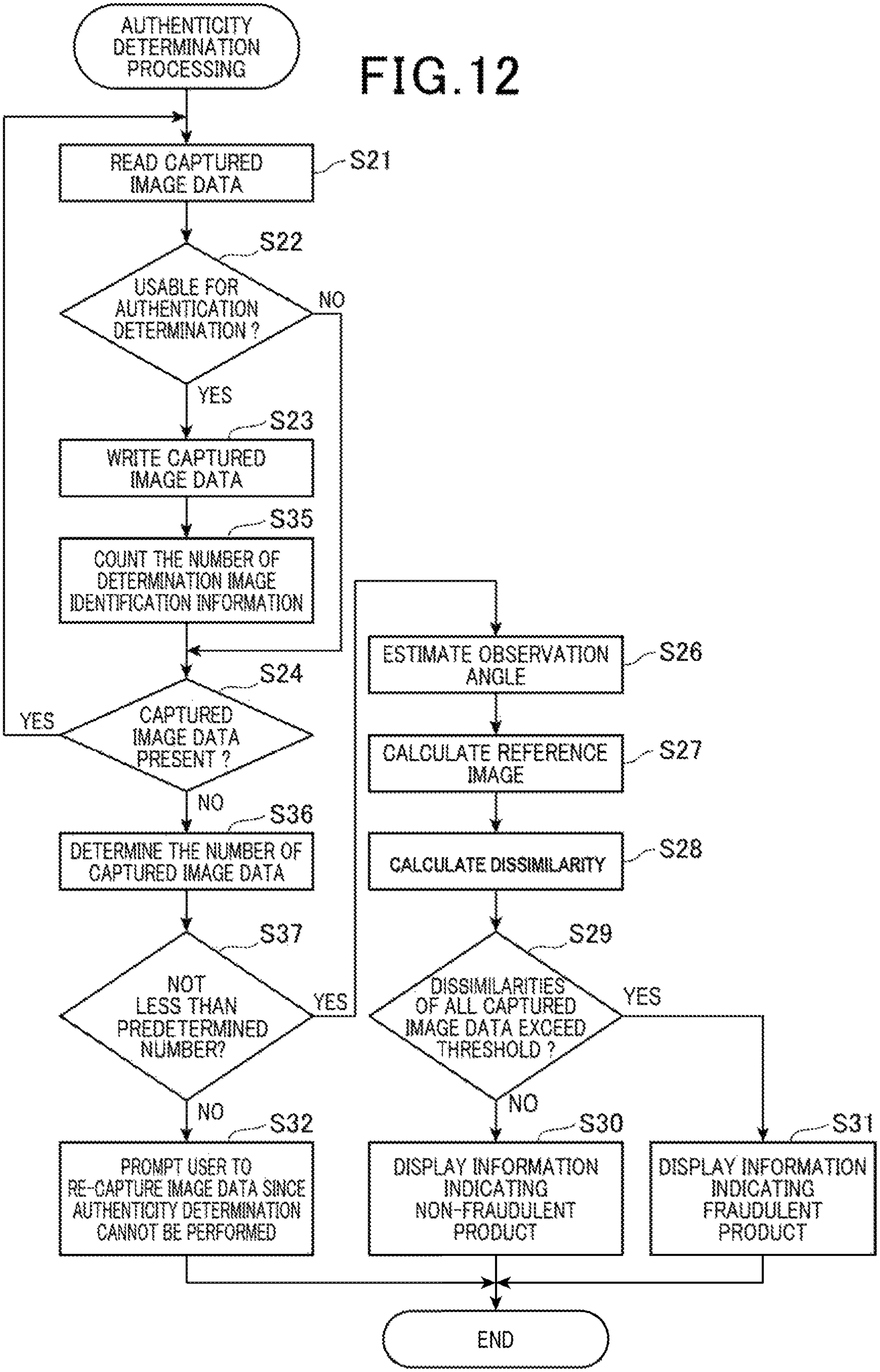
FIG. 12 is a flowchart for an operation example of authenticity determination processing of an object, using a counterfeit prevention determination medium in the identification system according to the second embodiment.

FIG. 12 is a flowchart showing an operation example of the authenticity determination performed for an object to be determined for authenticity using a counterfeit prevention medium, in the identification system according to the second embodiment.

For processes from steps S21 to S23 and step S26 onward are similar to the processes of the flow chart shown in FIG. 11. Hereinafter, only operations which differ from those in the first embodiment will be described.

Step S35:

The available image selection unit 106 counts the number of pieces of determination image identification information written into the authenticity determination captured image data table of the image data storing unit 111.

Step S24:

The available image selection unit 106 determines whether any captured image data is present (remains), without being subjected to comparable determination process, in the captured image data table of the image data storing unit 111. At this time, the available image selection unit 106 proceeds to step S21 when any captured image data remains without being subjected to the comparable determination process, and proceeds to step S36 when no captured image data remains without being subjected to the comparable determination process.

Step S36:

The available image selection unit 106 determines whether the number of pieces of determination image data identification information written into the authenticity determination captured image data table of the image data storing unit 111 is not less than a predetermined threshold number, that is, determines whether the number of captured image data that can be used for the authenticity determination is not less than the predetermined threshold. At this time, the available image selection unit 106 proceeds to step S26 when the number of pieces of determination image data identification information written into the authenticity determination captured image data table is not less than the predetermined threshold number. On the other hand, the available image selection unit 106 proceeds to step S32, when the number of pieces of determination image data identification information written into the authenticity determination captured image data table is less than the predetermined threshold number.

According to the above-described configurations, the predetermined threshold number or more of captured image data, where the counterfeit prevention medium is captured at different observation angles, are compared with respective reference image data which are genuine images of the counterfeit prevention medium captured at the different observation angles, thereby determining whether the counterfeit prevention medium is genuine or fake. Accordingly, without using a conventionally used special authenticity determination device, and without depending on the disposition condition of the counterfeit prevention medium, authenticity of the counterfeit prevention medium (genuine or fake) can readily be determined by capturing images of the counterfeit prevention medium with a simple image capturing device such as general purpose digital camera. Further, according to the present embodiment, depending on the properties of the counterfeit prevention medium, a predetermined threshold number is set as the number of captured image data available for the authenticity determination. Hence, the authenticity determination can be performed accurately for each of the counterfeit prevention media.

Third Embodiment

Hereinafter, with reference to the drawings, a third embodiment of the present invention will be described.

Figure 13:
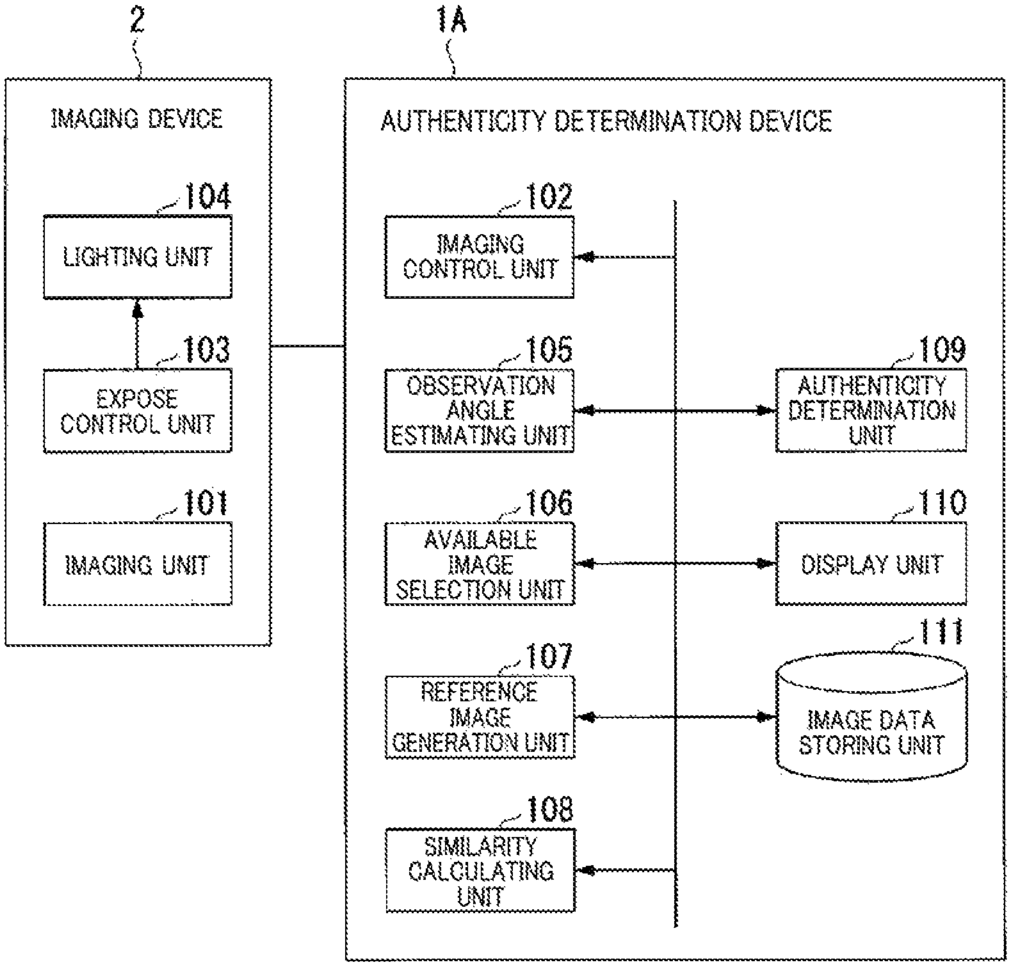
FIG. 13 is a block diagram showing a configuration example of an identification system according to the third embodiment.

FIG. 13 is a block diagram showing a configuration example of an identification system according to the third embodiment. In FIG. 13, the identification system is provided with an authenticity determination device 1A and an imaging device 2. The authenticity determination device 1A is provided with an imaging control unit 102, an observation angle estimating unit 105, an available image selection unit 106, a reference image generation unit 107, a similarity calculating unit 108, an authenticity determination unit 109, a display unit 110 and an image data storing unit 111. The imaging control unit 2 includes an imaging unit 101, an exposure control unit 103 and a lighting unit 104. In FIG. 13, the same reference signs as the first embodiment are applied to components similar to the first embodiment.

According to the present embodiment, the identification system is configured such that the imaging function and the exposure function of the first embodiment is served by the imaging device 2 which is separated from the authenticity determination device 1A. Thus, as an imaging device, a general purpose digital camera or mobile terminals (including cellular phones and smart phones) can readily be used for capturing the captured image data for the authenticity determination.

Although not shown, the authenticity determination device 1A may be provided in the form of a cloud configuration to enable communication with digital cameras or mobile terminals via an information communication line. Similar to the first and second embodiments, the authenticity determination device 1A may perform the authenticity determination for the counterfeit prevention medium using the captured image data transmitted from a digital camera or a mobile terminal.

Fourth Embodiment

Hereinafter, with reference to the drawings, a fourth embodiment of the present invention will be described. According to the above-described first to third embodiments, the counterfeit prevention medium has retroreflection properties, and the imaging unit 101 is integrated, together with the imaging unit 101, into the authenticity determination device 1 or the imaging unit 2. However, as shown in FIG. 3, the counterfeit prevention medium may have characteristics in which light emitted from the light source 200 transmits therethrough and the captured image data of the transmitted light pattern is used for the authenticity determination (e.g., transmission hologram). In this case, the light source has to be disposed at a position allowing the transmitted light of the counterfeit prevention medium to enter the imaging unit. Therefore, according to the fourth embodiment of the present embodiment, the lighting unit 104 is required to be separated from the imaging unit 2 or the authenticity determination device 1.

Figure 14:
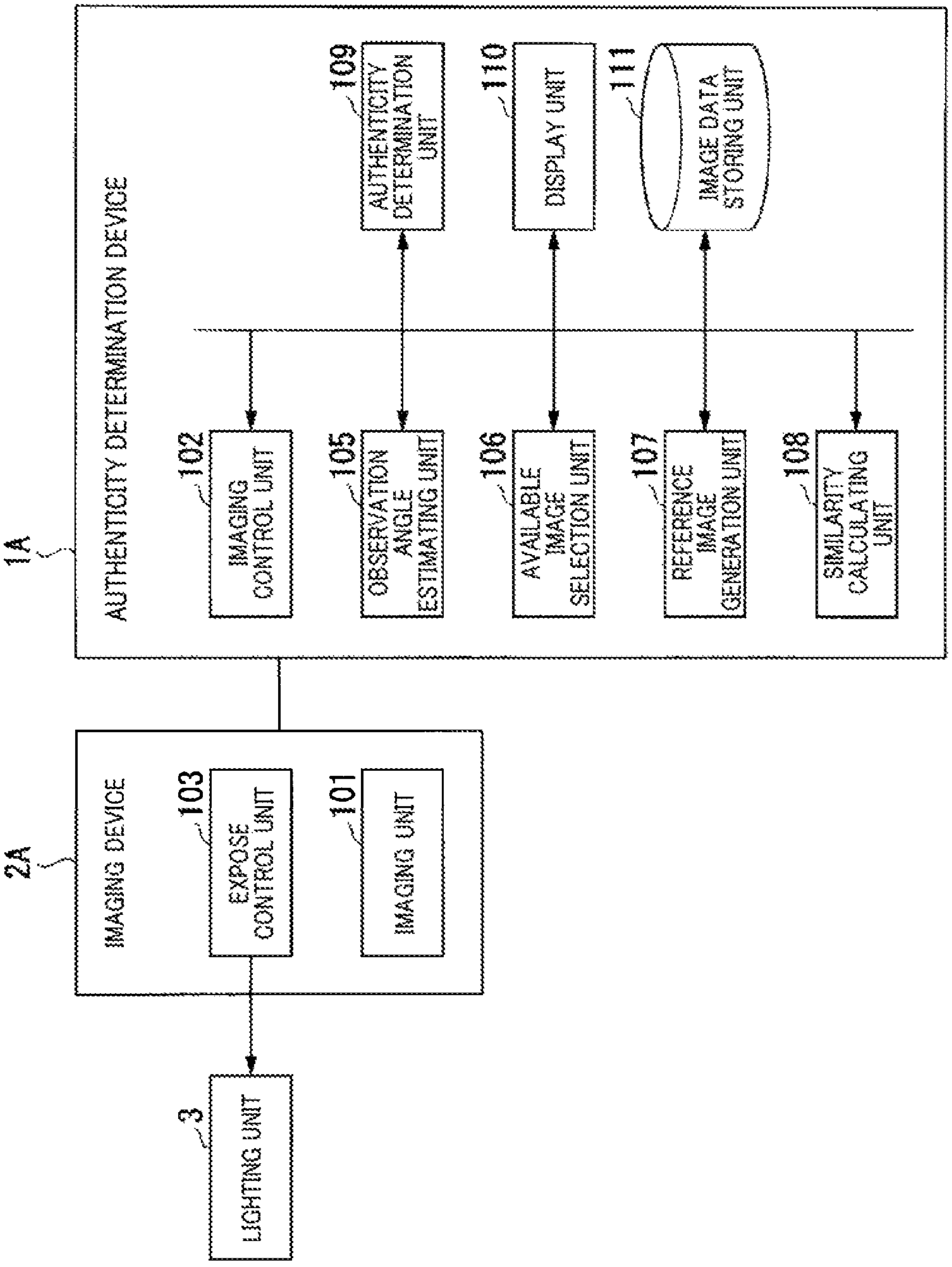
FIG. 14 is a block diagram showing a configuration example of an identification system according to the fourth embodiment.

FIG. 14 is a block diagram showing a configuration example of an identification system according to the fourth embodiment. According to the identification system shown in FIG. 14, a lighting device 3 (lighting unit 104) is separated from the authenticity determination device 1A and the imaging unit 2A. Thus, as shown in FIG. 3, the lighting device 3 (light source 200 emits light for capturing images to the counterfeit prevention medium 400 at the irradiation angle β. Once the light for capturing images enters the counterfeit prevention medium 400, the counterfeit prevention medium emits a predetermined light pattern. As described, the light pattern changes depending on the observation angle α. Also, the light pattern changes depending on the irradiation angle β even when the observation angle α remains unchanged.

As described, in the case where the counterfeit prevention medium has characteristics of emitting a light pattern by transmission, not only the observation angle α but also the irradiation angle β have to be adjusted. Specifically, simulation is applied to the structure of the counterfeit prevention medium 400, of which the reference image data is to be generated, so as to obtain the irradiation angle β, or the irradiation angle β of the illumination light from the lighting device 3, when capturing an image for the authenticity determination, relative to the counterfeit prevention medium 400, has to be adjusted to be the irradiation angle β of the irradiation light relative to the counterfeit prevention medium 400 when the image data is captured in advance.

Accordingly, in the fourth embodiment, the identification system is provided with the authenticity determination device 1A, the imaging unit 2A and the lighting device 3. The authenticity determination device 1A is provided with an imaging control unit 102, an observation angle estimating unit 105, an available image selection unit 106, a reference image generation unit 107, a similarity calculating unit 108, an authenticity determination unit 109, a display unit 110 and an image data storing unit 111. The authenticity determination is similar to those in the first and second embodiments.

The imaging control unit 2 includes an imaging unit 101, and an exposure control unit 103. In FIG. 14, the same reference signs are applied to the same components as those of the first embodiment. The lighting device 3 may be configured of, similarly to the lighting unit 104, a light emission device, e.g., a flash or a strobe light unit, which irradiates light to the object to be imaged for a short period of time, not necessarily the ordinarily used lighting device which irradiates light to the object to be imaged continuously. The lighting device 3 irradiates, in response to the emission command from the exposure control unit 103, light having a predetermined intensity to the object to be imaged.

According to the present embodiment, the captured image data of the counterfeit prevention medium is compared with the reference image data which is a true counterfeit prevention medium captured at the observation angle of the captured image data, to determine whether the counterfeit prevention medium is genuine or fake. Hence, without using a conventionally used special authenticity determination device, and without depending on the disposition condition of the counterfeit prevention medium, authenticity of the counterfeit prevention medium (genuine or fake) can readily be determined by capturing an image of the counterfeit prevention medium with a simple image capturing device such as general purpose digital camera.

Also, according to the present embodiment, since the lighting device 3 is separated from the authenticity determination device 1A or the imaging unit 2A, when the light emitted from the lighting device 3 transmits the counterfeit prevention medium, the image data of the light pattern transmitted at respective observation angles α can readily be captured, being adapted to the counterfeit prevention medium having different patterns of the transmitted light depending on the observation angles.

A program which accomplishes the functions of the authenticity determination device 1 shown in FIG. 1 and the authenticity determination device 1A shown in FIG. 13 may be stored into a computer-readable recording medium (readable medium). The program stored in the recording medium may be loaded into a computer system to execute the program, thereby performing the authenticity determination of the counterfeit prevention medium using the captured image data. It should be noted that the computer system includes hardware such as an operating system (OS) or peripheral devices. The computer system includes a home page provision environment (or display environment) adapted for WWW (world wide web) system. The computer readable recording medium refers to a memory device, including a removable media such as a flexible disk, optical-magneto disk, ROM or CD-ROM, or a hard disk drive integrated to a computer system. Further, the computer readable recoding medium includes a recoding medium which stores a program for a given period, e.g., a server to which a program is transmitted via a network such as internet, or via a communication line such as a phone line, or a volatile memory (RAM) installed in a computer system serving as a client.

Also, the above-described program may be transmitted to another computer system from the computer system in which the program is stored in the memory unit or the like, via a transmission medium or transmission waves in the transmission medium. The transmission medium which transmits the program refers to a medium having a function of transmitting information, e.g., a network (e.g., communication network) such as an internet, a communication line such as phone line (communication line). The above-described program may accomplish a part of the above-described function. The above-described program may be a differential program that accomplishes the above-described function with an existing program stored in a computer system.

As described, preferred embodiments of the present invention have been described so far. These embodiments are examples and should not be construed as limitations. Any additions, omissions, replacements and other changes can be made without departing the scope of the present invention. Accordingly, the present invention should not be limited by the above descriptions but is limited by the scope of claims.

The embodiments of the present invention are an identification device, an identification method, an identification program and a computer readable medium including the identification program, where authenticity of a counterfeit prevention medium (genuine or fake) can readily be determined by capturing an image of the counterfeit prevention medium with a simple image capturing device, such as a general purpose digital camera, without using a conventionally used special authenticity determination device, and without relying on the disposition condition of the counterfeit prevention medium.

A first aspect of the present invention is an identification device that performs an authenticity determination of a product on which a counterfeit prevention medium is attached. The device includes: a reference image generation unit that generates a reference image data corresponding to an observation angle, the reference image data being compared with a captured image data where the counterfeit prevention medium is captured, with a pattern of light to be observed of the counterfeit prevention medium changing depending on the observation angle, the observation angle being an angle formed between a reference line of a surface to be observed of the counterfeit prevention medium and an imaging direction of the captured image data; a similarity calculating unit that calculates a similarity between the captured image data and the reference image data; and an authenticity determination unit that performs an authenticity determination whether the counterfeit prevention medium is correct, on the basis of whether the similarity exceeds a predetermined threshold.

According to a second aspect of the present invention, in the identification device of the first aspect, the authenticity determination unit compares each of a plurality of different captured image data with the reference image data corresponding to the observation angle of the captured image data to perform the authenticity determination on the basis of whether the similarity between the captured image data and the reference image data exceeds the threshold.

According to a third aspect of the present invention, in the identification device of the second aspect, the identification device further includes an available image selection unit that determines whether the observation angle of the captured image data is within a determinable range enabling authenticity determination based on an optical change of the counterfeit prevention medium, selects available captured image data available for the authenticity determination from the captured image data, and outputs the available captured image data as an available image data.

According to a fourth aspect of the present invention, in the identification device of the first to third aspects, the identification device further includes an observation angle estimating unit that calculates a position and an imaging direction at/in which the captured image data has been captured in a three-dimensional space where the counterfeit prevention medium is placed when the captured image data has been captured, on the basis of a predetermined coordinate conversion equation, and calculates the observation angle on the basis of the position and the imaging direction.

A fifth aspect of the present invention is an identification method of performing an authenticity determination of a product on which a counterfeit prevention medium is attached. The method includes: generating a reference image data corresponding to an observation angle, the reference image data being compared with a captured image data where the counterfeit prevention medium is captured, with a pattern of light to be observed of the counterfeit prevention medium changing depending on the observation angle, the observation angle being an angle formed between a reference line of a surface to be observed of the counterfeit prevention medium and an imaging direction of the captured image data;

A sixth aspect of the present invention is an identification program causing a computer to operate a method of performing an authenticity determination of a product on which a counterfeit prevention medium is attached. The program comprising steps of: generating a reference image data corresponding to an observation angle, the reference image data being compared with a captured image data where the counterfeit prevention medium is captured, with a pattern of light to be observed of the counterfeit prevention medium changing depending on the observation angle, the observation angle being an angle formed between a reference line of a surface to be observed of the counterfeit prevention medium and an imaging direction of the captured image data; calculating a similarity between the captured image data and the reference image data; and performing an authenticity determination whether the counterfeit prevention medium is correct, on the basis of whether the similarity exceeds a predetermined threshold.

A seventh aspect of the present invention is a computer readable medium including an identification program causing a computer to execute an authenticity determination process of a product on which a counterfeit prevention medium is attached. The authenticity determination process includes: a process of generating a reference image data corresponding to an observation angle, the reference image data being compared with a captured image data where the counterfeit prevention medium is captured, with a pattern of light to be observed of the counterfeit prevention medium changing depending on the observation angle, the observation angle being an angle formed between a reference line of a surface to be observed of the counterfeit prevention medium and an imaging direction of the captured image data; a process of calculating a similarity between the captured image data and the reference image data; and a process of performing an authenticity determination whether the counterfeit prevention medium is correct, on the basis of whether the similarity exceeds a predetermined threshold.

According to the aspect of the above-described present invention, an identification device, an identification method, an identification program and a computer readable medium including a computer-readable medium can be provided, where an authenticity determination of the counterfeit prevention medium (genuine or fake) can readily be performed by capturing an image of the counterfeit prevention medium with a simple image capturing device such as general purpose digital camera, without using a conventionally used special authenticity determination device, and without depending on the disposition condition of the counterfeit prevention medium.

REFERENCE SIGNS LIST

1, 1A: authenticity determination device
2, 2A: imaging device
3: lighting device
101: imaging unit
102: imaging control unit
103: exposure control unit
104: lighting unit
105: observation angle estimating unit
106: available image selection unit
107: reference image generation unit
108: similarity calculating unit
109: authenticity determination unit
110: display unit
111: image data storing unit
310: first uneven structure
320: second uneven structure
330: directivity scattered structure
331: light scattering structure
333: light scattering axis
400: counterfeit prevention medium Obviously, numerous modifications and variations of the present invention are possible in light of the above teachings. It is therefore to be understood that within the scope of the appended claims, the invention may be practiced otherwise than as specifically described herein.

What is claimed is:

1. A device for determining authenticity, comprising:
processing circuitry configured to
generate reference image data of a counterfeit prevention medium at an observation angle for comparison with captured image data obtained based on a pattern of light observed from the counterfeit prevention medium at the observation angle between an imaging direction of the captured image data and a reference line of a surface of the counterfeit prevention medium,
calculate similarity between the captured image data and the reference image data, and
determine authenticity of the counterfeit prevention medium based on whether the similarity exceeds a threshold, wherein
the processing circuitry is further configured to determine whether the observation angle of the captured image data is within a range that allows authenticity determination based on an optical change of the counterfeit prevention medium.

2. The device of claim 1, wherein the processing circuitry is further configured to determine the authenticity based on comparisons of captured image data and reference image data at a plurality of observation angles.

3. The device of claim 1, wherein the processing circuitry is further configured to, after determining whether the observation angle of the captured image data is within the range that allows authenticity determination based on the optical change of the counterfeit prevention medium, select available captured image data available for the authenticity determination from the captured image data, and output the available captured image data as available image data.

4. The device of claim 1, wherein the processing circuitry is further configured to calculate, based on a coordinate conversion equation, a position and an imaging direction of the captured image data in a three-dimensional space in which the counterfeit prevention medium being captured is placed, and calculate the observation angle based on the position and the imaging direction.

5. A method of determining authenticity, the method comprising:

generating reference image data of a counterfeit prevention medium at an observation angle for comparison with captured image data obtained based on a pattern of light observed from the counterfeit prevention medium at the observation angle between an imaging direction of the captured image data and a reference line of a surface of the counterfeit prevention medium;

calculating similarity between the captured image data and the reference image data; and determining authenticity of the counterfeit prevention medium based on whether the similarity exceeds a threshold, wherein the method further comprises determining whether the observation angle of the captured image data is within a range that allows authenticity determination based on an optical change of the counterfeit prevention medium.

6. The method of claim 5, further comprising:

determining the authenticity based on comparisons of captured image data and reference image data at a plurality of observation angles.

7. The method of claim 5, further comprising, after determining whether the observation angle of the captured image data is within the range that allows authenticity determination based on the optical change of the counterfeit prevention medium:

selecting available captured image data available for the authenticity determination from the captured image data; and outputting the available captured image data as available image data.

8. The method of claim 5, further comprising:

calculating, based on a coordinate conversion equation, a position and an imaging direction of the captured image data in a three-dimensional space in which the counterfeit prevention medium being captured is placed; and calculating the observation angle based on the position and the imaging direction.

9. A non-transitory computer-readable medium including computer executable instructions, wherein the instructions, when executed by a computer, cause the computer to perform a method of determining authenticity, the method comprising:

generating reference image data of a counterfeit prevention medium at an observation angle for comparison with a captured image data obtained based on a pattern of light observed from the counterfeit prevention medium at the observation angle between an imaging direction of the captured image data and a reference line of a surface of the counterfeit prevention medium;

calculating similarity between the captured image data and the reference image data; and determining authenticity of the counterfeit prevention medium based on whether the similarity exceeds a threshold, wherein the method further comprises determining whether the observation angle of the captured image data is within a range that allows authenticity determination based on an optical change of the counterfeit prevention medium.

10. The non-transitory computer readable medium of claim 9, wherein the method further comprises:

determining the authenticity based on comparisons of captured image data and reference image data at a plurality of observation angles.

11. The non-transitory computer readable medium of claim 9, wherein the method further comprises, after determining whether the observation angle of the captured image data is within the range that allows authenticity determination based on the optical change of the counterfeit prevention medium;

selecting available captured image data available for the authenticity determination from the captured image data; and outputting the available captured image data as available image data.

12. The non-transitory computer readable medium of claim 9, wherein the method further comprises:

calculating, based on a coordinate conversion equation, a position and an imaging direction of the captured image data in a three-dimensional space in which the counterfeit prevention medium being captured is placed; and calculating the observation angle based on the position and the imaging direction.

13. The device of claim 1, wherein the processing circuitry is configured to determine whether the observation angle of the captured image data is within the range that allows authenticity determination, before generating the reference image data.

14. The device of claim 1, wherein the processing circuitry is further configured to select available captured image data available for the authenticity determination from the captured image data.

15. The device of claim 1, wherein the processing circuitry is further configured to calculate, based on a coordinate conversion equation, a position and an imaging direction of the captured image data in a three-dimensional space in which the counterfeit prevention medium being captured is placed.

* * * * *